United States Patent [19]
Holcomb et al.

[11] Patent Number: 5,113,751
[45] Date of Patent: May 19, 1992

[54] BEVERAGE BREWING SYSTEM

[75] Inventors: Robert R. Holcomb, Nashville; Edward R. Arnold; Alexander J. Garrison, both of Selmer, all of Tenn.

[73] Assignee: Aqua Dynamics Group Corp., Adamsville, Tenn.

[21] Appl. No.: 531,021

[22] Filed: May 31, 1990

[51] Int. Cl.$^5$ .............................................. A47J 31/00
[52] U.S. Cl. ........................................ 99/286; 99/307; 206/818
[58] Field of Search ............... 99/279, 275, 277.1, 99/284, 286, 290, 291, 295, 299, 300, 301, 302 R, 304, 306, 305, 307, 316; 426/433; 206/818

[56] References Cited

U.S. PATENT DOCUMENTS

| | | |
|---|---|---|
| 1,773,275 | 8/1930 | Neeley . |
| 2,596,743 | 5/1952 | Vermeiren . |
| 3,511,776 | 5/1970 | Avampato . |
| 3,625,884 | 12/1971 | Waltrip . |
| 3,931,494 | 1/1976 | Fisher et al. . |
| 4,082,939 | 4/1978 | Walters et al. . |
| 4,288,323 | 9/1981 | Brigante . |
| 4,365,975 | 12/1982 | Williams . |
| 4,367,143 | 1/1983 | Carpenter . |
| 4,407,719 | 10/1983 | Van Gory . |
| 4,545,887 | 10/1985 | Arnesen . |
| 4,582,629 | 4/1986 | Wolf . |
| 4,601,834 | 7/1986 | Bailes . |
| 4,605,498 | 8/1986 | Kulish . |
| 4,659,479 | 4/1987 | Stickler et al. . |
| 4,662,271 | 5/1987 | Woltermann .................. 99/295 |
| 4,713,522 | 12/1987 | Kimura . |
| 4,746,425 | 5/1988 | Stickler et al. . |
| 4,808,306 | 2/1989 | Mitchell et al. . |
| 4,865,747 | 9/1989 | Larson et al. . |
| 4,865,748 | 9/1989 | Morse . |
| 4,872,401 | 10/1989 | Lee .................................. 99/275 |
| 4,888,113 | 12/1989 | Holcomb . |
| 4,889,041 | 12/1989 | Mahlich ............................ 99/286 |

FOREIGN PATENT DOCUMENTS

| | | |
|---|---|---|
| 463844 | 8/1928 | Fed. Rep. of Germany . |
| 417501 | 9/1934 | United Kingdom . |
| 605154 | 8/1948 | United Kingdom . |

OTHER PUBLICATIONS

The Ion Stick. Brochure, 6 pages, York Energy Conservation, Feb. 1988.

Primary Examiner—Robert W. Jenkins
Attorney, Agent, or Firm—Foley & Lardner

[57] ABSTRACT

Beverage brewing and/or warming systems benefit from water treatment and, in some cases, the elimination or reduction of the amount of AC heat heretofore provided for such devices. Water treatment is provided in the present invention by using magnetic treatment or electromagnetic treatment by direct injection in the fluid stream or a combination of such water treatment systems. Treatment preferably occurs prior to mixing of the heated brewing fluid and the beverage powder, but improved brewing also results from treatment at the discharge side of the brewing container, e.g. the discharge of a filter holder. Improved taste and a reduction in the amount of coffee used to obtain a desired taste level results from such treatment, and the holding qualities are also improved. The bitter taste resulting from extend holding periods can be minimized or eliminated. Magnetic treatment may employ a multi-magnet concept to create sharp field boundaries, or other magnetic water treatment devices. Fluid or DC resistance heating may be used to eliminate the undesirable effects of AC current on the brewed beverage, and holding qualities may be improved still further by embedding a magnetic treater in a pot warming device.

38 Claims, 4 Drawing Sheets

BEVERAGE BREWING SYSTEM

BACKGROUND OF THE INVENTION

1. Field of the Invention

The present invention relates generally to the art of beverage brewing and warming equipment, e.g. of the type used to brew coffee from ground coffee beans. More specifically, the invention relates in its preferred form to an improved drip coffee brewing system in which the fluid, before and/or after brewing takes place, is treated with a magnetic water treatment system and/or by the direct injection into the fluid of electromagnetic radiation, preferably in the radio frequency range. The present invention also relates to the reduction in the amount of coffee required for brewing and to the elimination of the bitterness which arises during brewing and upon standing. Methods of improving the holding or warming of brewed beverages are also described herein.

2. Background in the Art

It has been known for a long time that beverages can be brewed by mixing a ground substance (e.g., coffee or tea) with a heated liquid and extracting therefrom a beverage. The extraction typically is done using some form of filter.

Automatic drip coffee makers are extremely popular because they are quick, inexpensive and convenient. Unlike "perk" coffee makers which recycle the beverage over the grounds, drip coffee makers and similar devices for other beverages rely on a one pass flow of heated water over the powdered coffee, and a typical system includes a number of standard components.

Usually a water reservoir is provided which includes an immersion element for generating a stream of hot water, through a conduit, to an outlet located above a chamber. The chamber holds a filter (e.g. a paper filter) into which a powdered material (e.g. ground coffee) is placed. The water flows from the outlet, through the grounds and filter and typically through some sort of discharge outlet into a suitable receiver, such as a pot. The pot, in turn, typically rests on an AC heating plate for being maintained at a desirable drinking temperature (140° F.–180° F.) A similar brewing process occurs in drip makers in which a filter holder is located over a cup or pot and boiling water is deposited into the filter after having been heated on a stove or other device.

One major problem with such devices relates to the amount of coffee required, due in part to the one pass of the brewing fluid into the chamber. Grinding the coffee beans to a smaller average particle size does increase surface area and extraction rate, but this technique, leading to what is commonly referred to as an "auto-drip" grind, is not a complete solution to the problem.

In addition, coffee and tea have a tendency toward bitterness when brewed in drip, perk or other devices, and anyone familiar with the taste of coffee after it has been allowed to stand on an auto-drip burner for more than thirty minutes or so can attest to the increase in bitterness over time. In addition to taste deterioration, the beverage has a tendency to cloud on standing. These attributes may be caused in part by evaporation (i.e. concentration), but we have determined that they are also caused in significant part by the exposure of the beverage to the AC heating plate.

It would be highly desirable to provide a beverage brewing and warming system which could overcome these two principal problems of the prior and existing art.

Treatment of water to improve its properties for a variety of industrial and residential applications has been widely discussed in the scientific literature and in patents issued in the United States and other countries. The variety of devices for such treatment is so great that a comprehensive review thereof will not be undertaken here, it being generally known that such systems have been proposed based on technologies including static and dynamic magnetic treatment, treatment using electrostatic fields, ultrasound, externally generated heating radiation (such as a microwave), directly injected electromagnetic radiation, and, of course, a variety of chemical treatment techniques.

The scientific basis for the effects of various water treatment techniques has been widely debated and discussed, and opinions in the scientific community vary dramatically about the potential for such treatement techniques on an industrial or commercial scale. For example, in the Soviet Union, magnetic treatment of water to assist in removal or prevention of scale has been reported. Favorable analysis of such treatment has been criticized by literature generated in the United States. Some of the theories discussed include one which advocates a belief that magnetic treatment decreases the surface tension of the water molecules, thereby making it "wetter" than untreated water. Another advocates the belief that the magnetic fields generated within the water act only on the impurities contained within the water. Others relate to ionic charge theory, minor changes in the pH, changes in the zeta potential or the like.

Despite such debate over the scientific basis of the treatment effect, a number of individuals and companies are continuing to suggest new types of treatment devices for previously discussed applications and new technologies for unrelated and surprisingly diverse applications.

Examples of magnetic water treatment devices include the following:

Stickler, et al. U.S. Pat. No. 4,746,425 issued May 24, 1988 for "Cooling System For Magnetic Water Treating Device" and Stickler, et al. U.S. Pat. No. 4,659,479 issued Apr. 21, 1987 for "Electromagnetic Water Treating Device". Both Stickler, et al. patents use a pipe core of alternating magnetic and non-magnetic sections with an electromagnet surrounding the pipe through which the fluid to be treated passes.

Another treatment system is disclosed in Larson, et al. U.S. Pat. No. 4,865,747. An electromagnetic field having a voltage which operates in the range of 1 KHz to 1000 MHz is applied to a non-ferromagnetic conduit in which a ferromagnetic core is mounted. The core acts as a sacrificial anode and as a receiving antenna for the radiofrequency electromagnetic radiation.

A permanent magnet system is described in Mitchell U.S. Pat. No. 4,808,306, issued Feb. 28, 1989 for "Apparatus For Magnetically Treating Fluids" The field generator is mounted on one side of the pipe in a non-ferromagnetic housing and the magnet itself has an odd number of sections of alternating polarity. For fuel treatment the uppermost section is desirably a south polar magnetic field, while if water is to be treated, a north polar magnetic field is preferably located upstream. A ferromagnetic plate mounted adjacent to but outwardly from the pipe is used for increasing magnetic field strength. Mitchell indicates that his device can lead to fuel consumption savings, to maintain minerals and other contaminates of water in solution (softening of water), prevention of scale and rust and to improve the taste, cleaning and solvent properties of water.

Additional patents which refer to the use of magnets to treat water include Carpenter's U.S. Pat. No. 4,367,143 issued Jan. 4, 1983 for "Apparatus For Magnetically Treating Liquid Flowing Through A Pipe And Clamping Means Therefor". This patent discusses applying a plurality of strips of ferromagnetic material contained in a shoe member on the outside of a pipe, the number of magnet strips and the power of the magnets being selected for a particular pipe size. The polarity of the magnets in each strip are aligned in the same way, e.g. all south polar ends being oriented upstream with respect to water flow. See also Kulish U.S. Pat. No. 4,605,498 issued Aug. 12, 1986 for "Apparatus For Magnetic Treatment Of Liquids". The magnet arrangement of this patent (surrounding arcuate shape magnets) is such that the south pole magnetic fields are concentrated toward the axis of a pipe, while the north poles are directed radially outwardly.

These patents are representative of the wide diversity of treatment techniques discussed in the art and it is important for a more complete understanding of the prior art to read the "Background" sections of each of the foregoing patents (and the other two patents referred to later herein). Also the tabular listings of art cited against such patents should be reviewed. Each of the background disclosures and listings is incorporated herein and is made available by the copies of the patents supplied herewith.

A unique magnet arrangement for water treatment is disclosed in U.S. Pat. No. 4,888,113 issued to Robert R. Holcomb on Dec. 19, 1989 for "Magnetic Water Treatment Device". In this patent, Dr. Holcomb discusses the use of a plurality of rectangular magnets attached to the exterior of a pipe. The magnets are arranged in pairs adjacent the pipe such that the positive pole of one pair is oriented to one end of a support housing and the negative pole is oriented toward the other end of the housing. Another similarly constructed housing is secured to the opposite side of the pipe, the second housing also including a pair of magnets oriented in a reverse manner from those in the first housing. Thus the positive pole of the first set faces the negative pole of the second set to cause an "attractive" mode of magnetic flux treatment. Applications such as scale prevention, as well as use in washing machines, swimming pools, ice rinks, livestock watering and coffee brewing are suggested. The patent also suggests that the taste of treated water is superior to that of untreated water. The patent further mentions that the magnetic force fields can be generated through wound iron coils coupled to a DC generator. The arrangement of four facing magnetic surfaces described in the Holcomb patent will hereafter be referred to a quadrapolar magnetic treatment system.

Another water treatment technique is that disclosed in U.S. Pat. No. 4,865,748 issued Sep. 12, 1989 to Dwain Morse and entitled "Method And System For Variable Frequency Electromagnetic Water Treatment". In this device, a non-insulated conductor in direct contact with a fluid to be treated is coupled to a generator of electromagnetic radiation, preferably in the radio frequency range. According to the patent, the radiation is injected at a frequency which is related to the electromagnetic radiation absorbtion or emission profile of the particular system being treated. This patent also focuses on the use of that system for the elimination and prevention of scale build-up in boiler systems and the like.

The present invention relates not only to the treatment of water prior to brewing a beverage and the treatment of the brewed beverage to maintain flavor, but it also relates to warming systems for maintaining the brewed beverage in a desirable warm condition without the creation of bitter taste or oil separation. Accordingly, it is desirable at this stage to describe several patents which employ what will be described here as "non-conventional" heating techniques. A "conventional" technique would be any of the well known AC heating devices, such as those commonly available in residential and commercial auto-drip coffee makers. These typically employ an AC resistance type heater which, as discovered by the present inventors, in turn gives off fields which are undesirable for maintaining coffee in its most desirable flavorful mode for extended periods.

Before proceeding to a description of such coffee heating devices, it should be mentioned that another magnetic treatment descaling system is being sold for use with auto-drip coffee installations. It is said by the manufacturer of this device, Aqua-Flo, Inc. of Baltimore, Md., that use of its ceramic ferromagnetic treatement device on the incoming water pipe results in better tasting coffee (as determined by a test panel) having greater solids absorbtion and greater holding time. The heater system in the illustration of the Aqua-Flo device (as illustrated in the sales materials furnished herewith) would be classified in the "conventional" catagory as defined in the preceding paragraph and the suggested advantage of the device is said to result from a projected improvement of the water system based on the descaling characteristics of the magnets.

Non-typical beverage brewing systems are most frequently encountered as 12 or 110 volt conversion brewers for automobiles, recreational vehicles and the like. See, for example, Kimun, U.S. Pat. No. 4,713,522 issued Dec. 15, 1987 and entitled "Electric Heating Appliance Detachably Mounted In A Motor Vehicle" and Walters, et al. U.S. Pat. No. 4,082,939 issued Apr. 4, 1978 for "Vehicular Coffee Heater". Both patents, and the patent documents referred to therein are of this general type. Also known are battery powered heaters for liquids, such as Fisher, et al. U.S. Pat. No. 3,931,494 issued Jan. 6, 1976 for "Recharable Battery Heating Unit". This patent discloses a warming container for a pot or cup which includes a heating element connected to a recharagble battery and switch.

It would be highly desirable to provide a beverage brewing system which leads to improved coffee taste upon brewing, with decreased usage of ground coffee (or other beverage) and which could maintain the desirable taste for an extended period following completion of the brewing cycle.

SUMMARY OF THE INVENTION

According to the present invention, beverage brewing is enhanced by water treatment involving magnetic treatment, electromagnetic treatment, combinations thereof, and/or providing novel warming systems for brewed beverages.

In one embodiment, coffee or other beverage usage is reduced by employing multi-magnet treatment systems, either before brewing, after brewing or both.

In another embodiment of the invention, electromagnetic treatment is employed in lieu of the magnetic treatement, and in a preferred embodiment hereof, both types of treatment are combined to yield dramatic improvement in coffee taste and coffee utilization.

In still further embodiments of the invention, the treatment systems are combined with a warming system which can be a modified AC current warming plate, a plate heated by direct current or which includes a conduit for heated water flow in heat exchange relationship with a pot support surface. In another preferred embodiment, a magnet treatment device is used adjacent to a coffee pot to maintain or enhance coffee taste upon standing.

In an illustrated form, the invention includes a source for heated water and a conduit coupling such source to a filter compartment for containing ground coffee. Water flowing through the conduit is treated by the sharp field gradients of four magnets and/or by the direct injection into the water of electromagnetic radiation preferably in the radio frequency range. The treated water flows into the filter container, abstracting from the ground coffee the flavors desired. After flowing from the filter compartment, the liquid flows out of an exit conduit (at which location the coffee can be retreated using either or both of the aforementioned treatement techniques) following which the brewed beverage is collected in a pot which may be of conventional design. In the most preferred embodiment of the invention, the beverage brewing device includes a warming system for the pot to maintain the temperature of the beverage at a desirable level (e.g. 160°-190° F.) while minimizing exposure of the brewed beverage to the deleterious effects of AC current. A magnet system having multiple sharp field gradients is preferably used as part of the beverage holding system. Other ways in which the present invention provides improvements to this art will become apparent from the following description of the preferred embodiment, taken in conjunction with the drawings which accompany it.

BRIEF DESCRIPTION OF THE DRAWINGS

The accompanying drawings, which are incorporated in and constitute a part of the specification, illustrate the preferred embodiments of the invention and, together with the general description given above and the detailed description of the preferred embodiments given below, serve to explain the principles of the invention. Like reference numerals are used to describe like components.

DESCRIPTION OF THE PREFERRED EMBODIMENT

Figure 1:
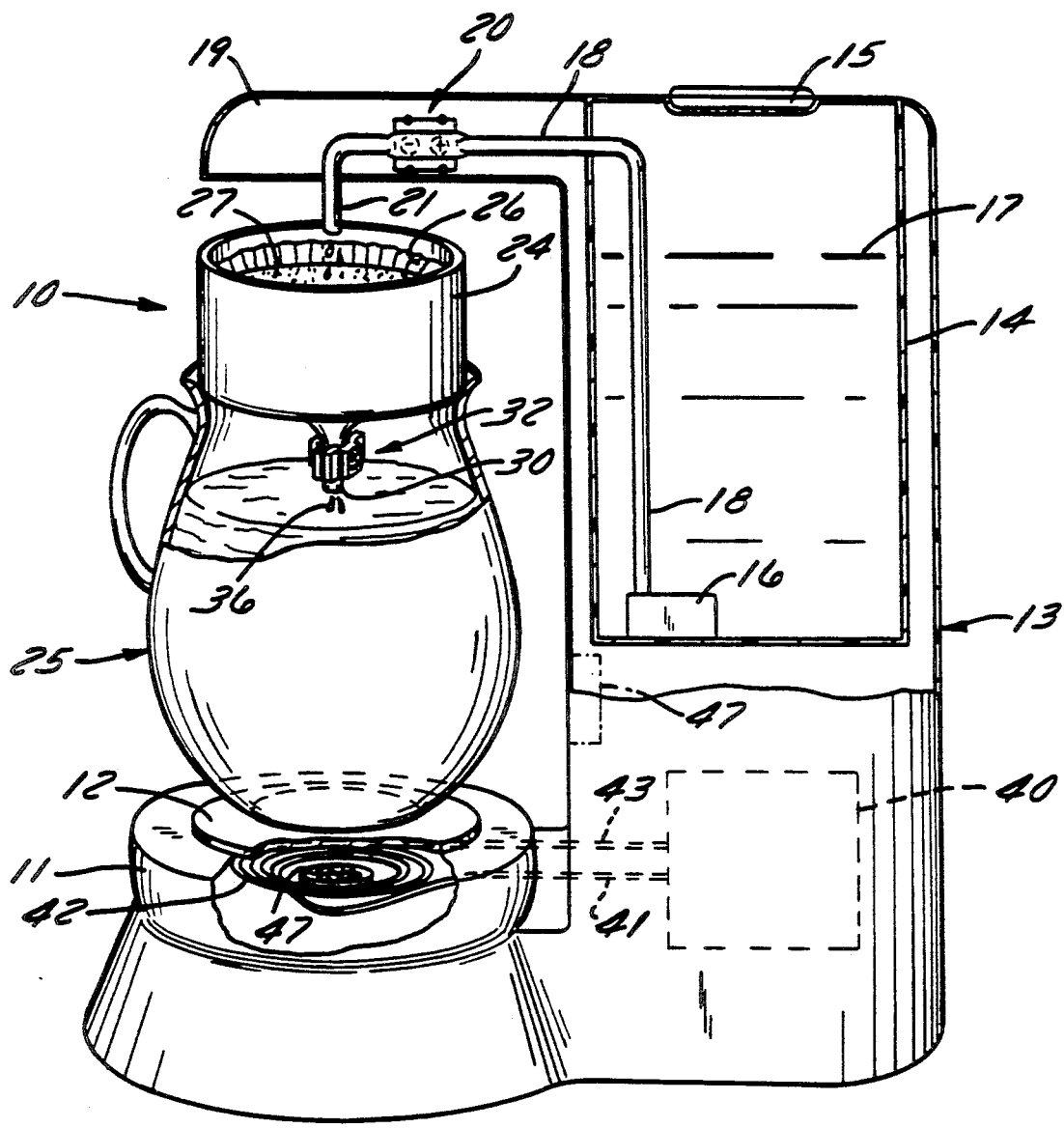
FIG. 1 is a partially cut away perspective view of a beverage brewing device according to the preferred embodiment of the invention.

In the description of the preferred embodiment of the invention a coffee brewing system will be used as an example, but it should be appreciated at the outset that the principles of the present invention have a much wider application, e.g. for tea or other drinks where a flavor component is extracted using heated water or other fluid. Also, many of the components of the preferred embodiment are shown in only general form, because the present invention can be employed with or as additions to numerous types of beverage brewing systems. Accordingly, such features of available systems as on/off controls, auto fill systems, timers, filters, temperature settings, alarms, and the like, are not shown herein.

The basic construction of a coffee maker 10 according to the present invention includes a base 11 for supporting surface 12 which in turn supports a flattened section of a pot 25 into which a brewed beverage is to be placed. An upright columnar portion 13 extends from one side of base 11 and typically contains a reservoir 14 having an inlet 15. The reservoir receives water 17 for brewing a pot of coffee. At this point, it would be appropriate to point out, by way of example, that for some units the reservoir and inlet are omitted and the brewing system is connected directly to a water supply line (such as in the very common office or restaurant systems).

A heating element 16 is provided in the illustrated reservoir 14 for heating the liquid 17 contained therein to a high enough temperature that water flows through a conduit 18 located in a generally horizontal plate portion 19 which extends out over the top of pot 25. Conduit 18, in the illustrated embodiment, terminates in an outlet opening 21. Beneath and surrounding the outlet 21 is a filter chamber 24 which contains a paper filter element 26 which, in turn, holds a ground beverage material such as ground coffee beans 27. The filter chamber has an outlet spout 30 permitting brewed coffee 36 to flow into pot 25.

Two multi-magnet treatment systems are provided in the FIG. 1 embodiment prior to coffee entering pot 25, both of which will be described in detail below. The first magnet treatment system 20 includes magnets disposed on either side of conduit 18 prior to outlet 21, and the second system 32 includes magnets disposed about the outlet spout 30 of the filter compartment. While treatment device 20 is important for the effective operation of coffee brewing system 10, device 32 provides principally additive effects and improvement in holding characteristics. While either could be eliminated, the preferred system would include both.

Figure 5:
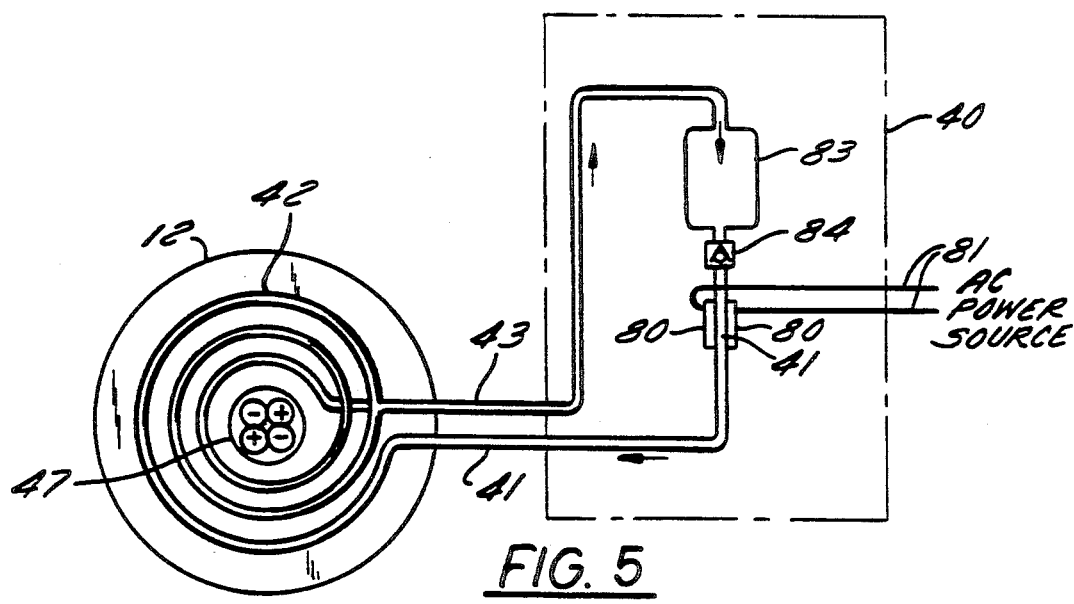
FIG. 5 is a diagrammatic view of a fluid convection warming system incorporated in the device shown in FIG. 1.

Another feature shown in FIG. 1 is a heater 40 for the plate 12, which heater again is shown in only general form here and in greater detail in FIG. 5. Heater 40 includes an outlet conduit 41 leading to a coil conduit 42, located beneath plate 12. and a return conduit 43. Any suitable means can be provided for heating and circulating a fluid through heater 40 and conduits 41-43 to cause heat exchange transfer through plate 12 to pot 25.

Figure 7:
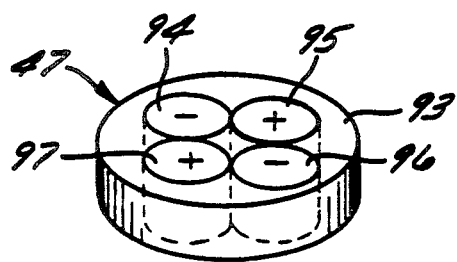
FIG. 7 is an enlarged view of a magnet arrangement preferably employed in the base of a beverage brewing device to assist in maintaining the brewed beverage in a desirable condition.

The last feature of the preferred embodiment shown in FIG. 1 is a second type of magnet treatment system 47, shown in greater detail in FIG. 7. Device 47 is positioned to magnetically treat the brewed coffee while it is contained in pot 25. In the present invention, the use of such a treatment system adjacent to the pot is a separable contribution to the beverage brewing art and may be used, for example, without the multi-magnet systems 20 and/or 32 for enhancing beverage keeping qualities. Moreover, such a magnet heating device 47 may be employed in combination with electromagnetic radiation treatment, with or without magnets, all as described below. Effective magnetic treatment of the coffee held in pot 25 could also be accomplished by placing a treatment system in column 13, as long as the magnetic fields eminating therefrom can reach the contents of pot 25, as shown in dotted line at 47 in FIG. 1.

Figure 2:
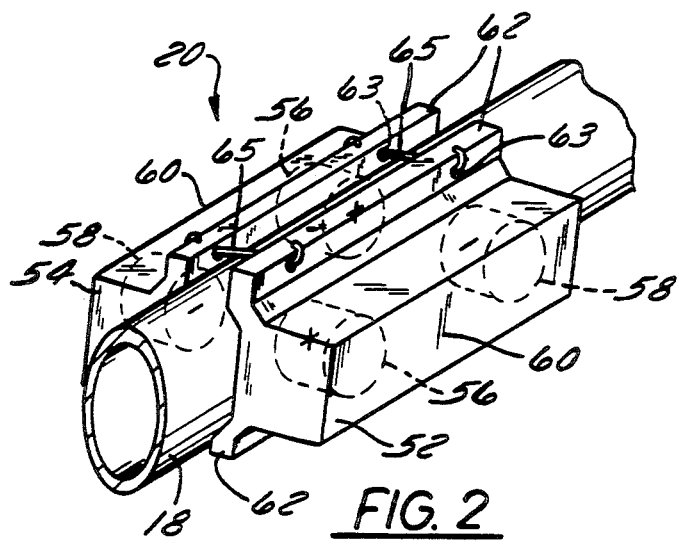
FIG. 2 is a perspective view of one of the magnetic treatment systems incorporated in the device shown in FIG. 1.
Figure 4:
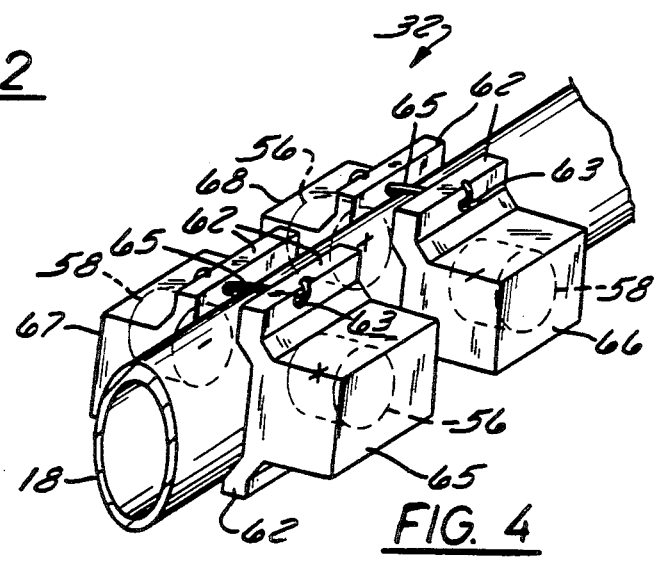
FIG. 4 is a perspective view of another embodiment of a magnetic treatment system which could be incorporated in the device shown in FIG. 1.
Figure 3:
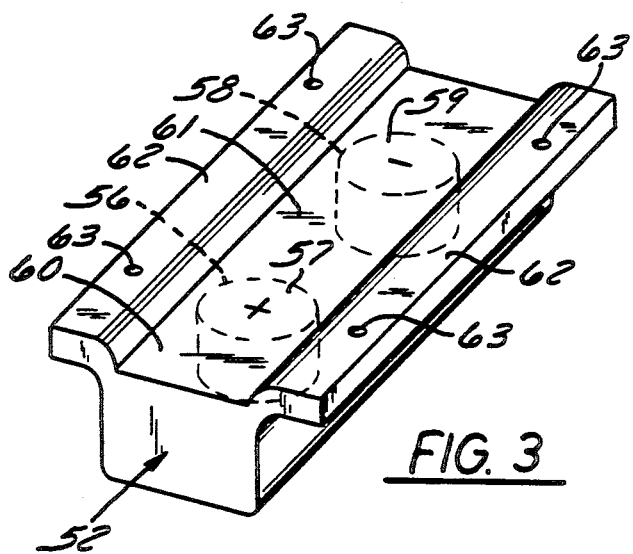
FIG. 3 is an enlarged perspective view of one of the magnetic treatment assemblies of the system shown in FIG. 2.

Details of the preferred multi-magnet treatment system are shown in FIGS. 2-4. Before describing such features it should be mentioned that the size of the magnets, their shape, as well as the number of multi-magnet systems employed will vary depending on the size of the brewing system, as well as on other design factors, such as space and cost. For example, two or more multi-magnet systems 20 could be employed in end to end relationship along conduit 18.

Each system (as exemplified by system 20) includes a pair of housings 52 and 54 made of non-ferromagnetic material such as a suitable resin, each housing having a cavity for receiving a pair of center face charged, perferably circular magnets (see FIG. 3). Housing 52 includes a pair of magnets 56 and 58, magnet 56 having a positive pole face 57 arranged to be disposed adjacent conduit 18 and magnet 58 having a negative pole face 59 so arranged. The housings may include any suitable potting material 61 for holding the magnets 56 and 58 in place. Suitable potting materials include epoxy and polyurethene resin.

Housings 52 and 54 each include an elongate generally rectangular body portion 60 for containing the two magnets surrounded by potting material 61 and a pair of flange portions 62 extending laterally therefrom. Holes 63 pass through flange portions 62 so that a pair of housings may be secured around the conduit 18, for example using wires 65.

Referring again to FIG. 2, it will be noted that housing 54 is similar to housing 52, but that its direction is reversed so that the negative pole face of its magnet adjoining the conduit is located across from the positive pole face magnet of housing 52. Similarly, housing 54 includes a positive face magnet located opposite and across from negative face 59 of magnet 58. In the illustrated system an alternative field mode is created with sharp field gradients for fluid flaring through conduit 18.

FIG. 4 shows an alternate arrangement for the four magnets, where four separate housings 65-68 are provided, each housing including a single magnet, the spatial arrangement thereof being similar to the arrangement shown in FIG. 2.

The magnetic treatment units just described are similar to those described in the aforementioned Holcomb patent, the disclosure of which is expressly incorporated herein by this reference. Magnetic treatment systems 20 and 32 could otherwise be embodied as shown in other embodiments of the Holcomb patent, for example use of electromagnets instead of the permanent type described hereinabove.

Another feature of the invention is the shape of conduit 18 in the vicinity of treatment system 20 (a similar shape could be used for outlet 30). Conduit 18 is generally oval in the area of magnetic treatment device 20 to allow the faces of the various treating magnets to be closer to one another than would be possible with a circular conduit of like cross-sectional area. This allows for greater treatment efficiency than could be achieved when the same magnets are located further from one another. Conduit 18, for best results, should be made from a non-ferromagnetic material, such as brass, copper, PVC, glass, etc. A rectangular conduit profile would also provide the same benefit, the oval and rectangular profiles and their equivalents being referred to in this specification as "non-circular" cross-sections.

The magnets used by the present inventors for system 20, and which could also be used for system 32, are preferably face charged circular, ceramic or neodymium magnets (other shapes could also be used) having a strength of about 2000-3000 gauss, such as those sold by Tridus International (Los Angeles, Calif.) rated at 2000 gauss and having an energy product of 27 megaoersteds. The strength of the magnets used in the treatment system of the present invention may be increased by design or by stacking a plurality of smaller magnets radially with respect to the axis of the conduit.

FIG. 5 shows additional details of heater 40 and is illustrative rather than limiting with respect to the types of heaters which can be used on coffee maker 10. Within heater 40 are a pair of resistance heating bars 80 coupled to a source of AC power by leads 81. Bars 80 surround a portion of conduit 41 to heat a fluid, such as antifreeze (b.p. 266° F., f.p. −34° F.) or other liquid, to a desirable temperature for heat exchange with plate 12. The return conduit 43 leads to an expansion tank 83, in turn leading to a one-way valve 84 in advance of the heater bar section. Copper may be used in the preferred embodiment for the conduits, due to its excellent heat conducting properties.

Figure 1A:
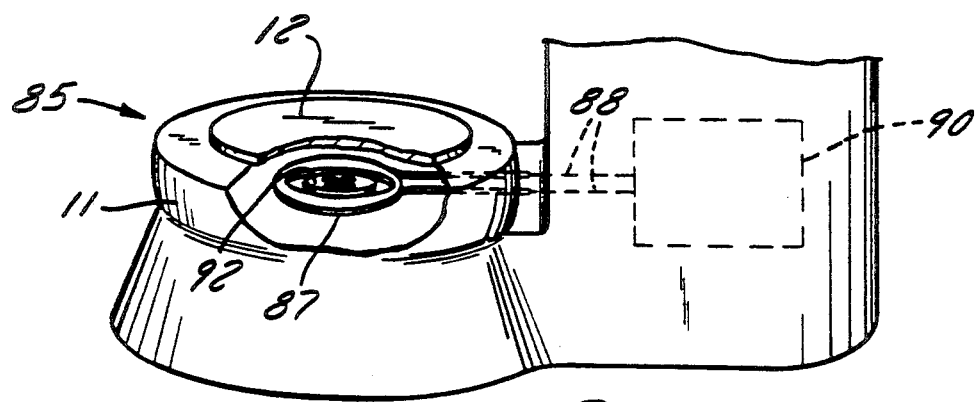
FIG. 1A is a portion of a device as shown in FIG. 1 with a direct current heating system for the pot.
Figure 1B:
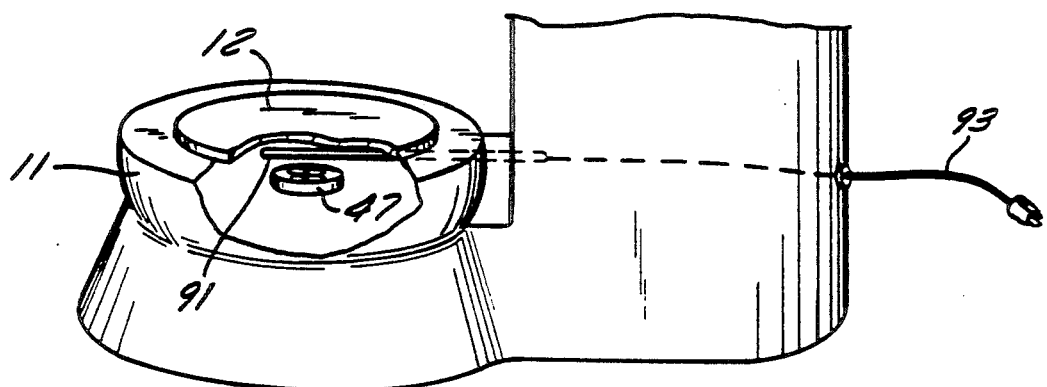
FIG. 1B is a portion of a device as shown in FIG. 1 with an alternating current heating system for the pot.

It is most desirable, but not essential, to maintain the AC components of the power system remote from plate 12, and shown in FIG. 1A is a portion of a coffee brewing system 85 where the plate 12 is mounted above a resistance heating coil 87 which in turn is coupled by DC power leads 88 to transformer 90. The element itself can be any known resistance material and a hole 92 is provided at the center of coil 87 for receiving magnet 47 which will soon be described in greater detail. FIG. 1B shows yet another heater system, wherein an AC resistence rod 91 extends from power cord 92, it being preferred to space rod 91 from the lower portion of plate 12 to avoid uneven heating or hot spots which can increase bitterness and reduce coffee holding time.

Other heating systems for one or more pots of brewed beverages may be employed with the magnetic treatment system of the present invention, including standard AC resistance devices which are common with office, residential and restaurant size coffee makers. Moreover, it is well known that heating elements may be located at places other than beneath the outlet from the filter and those aspects of the present invention which relate to post-brewing treatment to improve holding time and flavor are applicable at such locations as well. For example, in a well known office coffee brewing system, two additional heating plates are provided (for use with decaffinated coffee and hot water, for instance), and the fluid flow, magnetic treatment, DC resistance heating or spaced AC heating and combinations thereof could be used for all three heating plates in such devices.

Magnet 47 may take a variety of sizes and forms but is preferably a multi-component magnet as shown in FIG. 7, which includes a housing 93, circular in the illustrated form and made from non-ferromagnetic material. Located within housing 93 are four center face-charged magnets 94-97 arranged in a pattern such that the positive poles of magnets 94 and 95 are oriented toward plate 12 while the negative poles of magnets 96 and 97 are so arranged. The magnets identified above for use in the system 20 are also suitable for magnets 94-97. This arrangement also provides sharp field gradients, with the preferred arrangement being the cluster illustrated in FIG. 7 where in clockwise position the magnets are positive, negative, positive and negative. The magnets preferable touch one another so that each magnet falls within the sphere of influence of the adjacent magents.

In numerous informal taste tests conducted by the present inventors, substantial majorities of those tasting coffee made using the multi-magnet system on the incoming conduit favor the taste thereof to coffee prepared in conventional coffee brewing systems. It has also been determined in additional informal taste tests, that coffee maintained in a warm state with additional magnetic treatment adjacent to the pot and/or non-AC warming of the plate 12 resulted in less bitterness and greater holding time. Probably most importantly, it has been determined that coffee having similar or improved taste can be prepared using less ground coffee than that required in conventional systems if the incoming water is treated using the multi-magnet systems described above. While a scientific explanation of this phenomenon has not yet been fully developed, it appears that water treated by the system of FIG. 1 has improved extraction efficiency and that the stability of the taste is extended by additional magnetic treatment, as for example by magnet 47.

Figure 6:
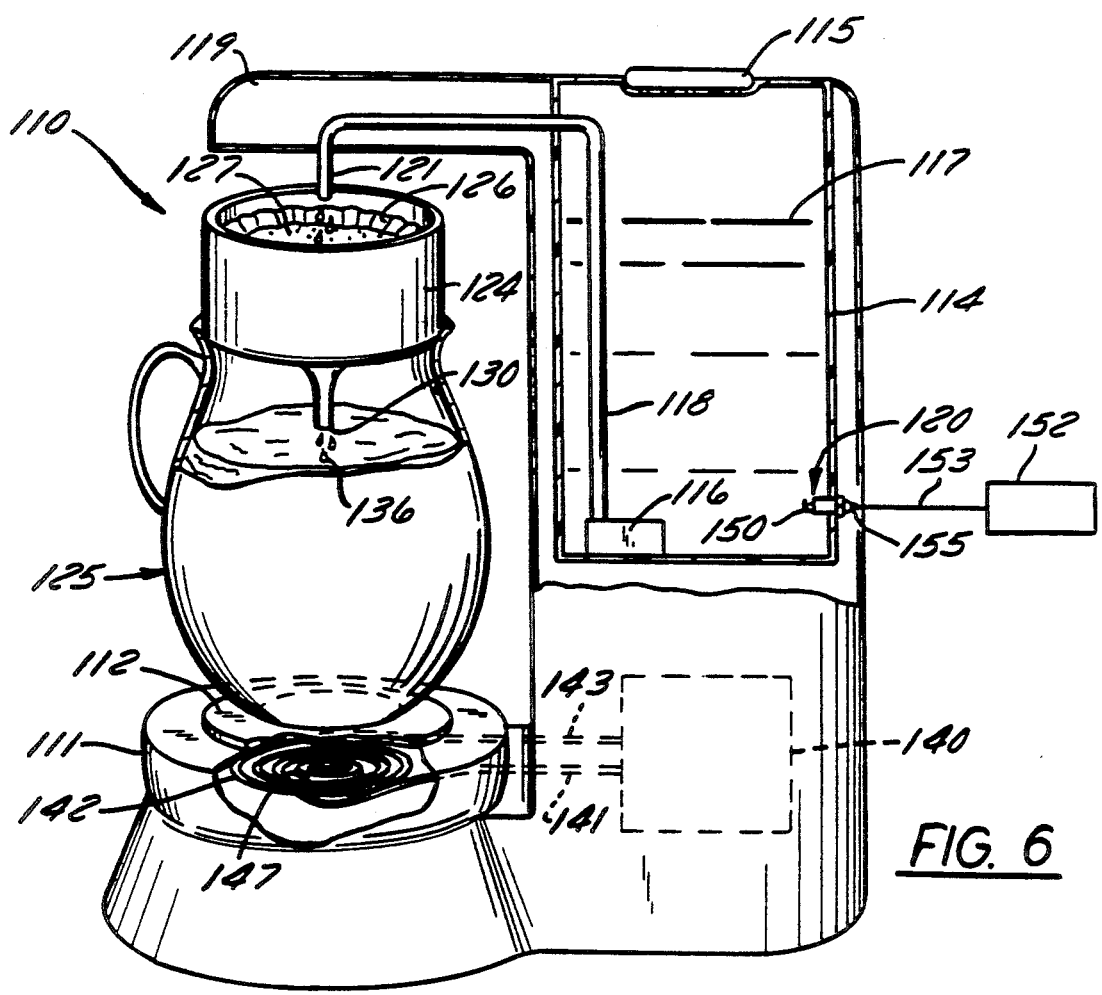
FIG. 6 is a partially cut away view of a beverage brewing device according to a second preferred embodiment of the invention which employs electromagnetic radiation treatment instead of magnetic treatment.

FIG. 6 shows an alternate embodiment of the present invention in which the direct injection of electromagnetic radiation into the incoming water for a coffee brewing device 110 may be used alone, or in conjunction with, the magnetic treatment devices shown in the FIG. 1 embodiment. Before beginning a detailed description of FIG. 6, it should be mentioned that the electromagnetic radiation injection system can be used in combination with other magnetic systems than the one described as a multi-magnet system in prior embodiments. For example, the direct injection of electromagnetic radiation could be used in conjunction with the other types of magnetic water treatment systems discussed in the beginning portions of this specification. Also, while only a single injection system is shown in FIG. 6, a similar system could be employed at the outlet spout 130 of the chamber 118, and this feature of the invention could be used with or without the pot magnetic treatment system shown in FIG. 6.

While it is not known how the electromagnetic radiation injection produces results similar to those encountered in using the FIG. 1 embodiment treatment system, informal tests have shown an improved extraction of coffee to much the same degree. Use of the two systems on small coffee brewers, while perhaps undesirable from a cost stand point, would be feasible for larger systems. Decreasing costs for components could also result in the applicability for smaller units such as those used in residences, small offices, hotel rooms and the like.

The basic treatment system employed in this embodiment is the treatment system disclosed in the aforementioned Morse U.S. Pat. No. 4,865,748. That disclosure is, accordingly, expressly incorporated herein by this reference. Further, the principles concerning absorption/emission profiles are applicable herein, in that it is desirable to inject the electromagnetic radiation at a frequency within the range of approximately 1 KHz to 1000 MHz, more preferably a frequency which is related to the absorption/emission profile of the incoming liquid. Because considerable costs are involved in the injection of variable frequencies into a liquid and the measurement of the absorption/emission profile thereof, for most beverage brewery applications, a frequency of about 43.5 MHz has been determined to be particularly effective. Results, however, can be optimized utilizing the steps described in detail in the aforementioned Morse patent.

The embodiment shown in FIG. 6 is identical to that shown in FIG. 1 except that 100 series numerals are used to describe the invention and the multi-magnet system 20 and 32 have been eliminated. In lieu thereof, a conductive probe, such as a platinum tipped spark plug 120, is mounted in reservoir 114 in such a way that the tip 150 of the probe is in direct contact with the water supply. Stainless steel or other conductive materials can be used in lieu of platinum. An electromagnetic wave generator 152 is coupled by impedence matched coaxial wires 153 to the external connector 155 of the spark plug 120 so that electromagnetic radiation consisting of particulate and non-particulate wave components is provided to the tip 150.

The length of time for injection of the electromagnetic radiation can be varied widely, as can the location of the probe 120. If a reservoir type system is employed, continuous treatment can take place at that location. Alternately, treatment can take place only at the time water is caused to enter chamber 124 so that the frequency generator would be coupled into the system's timer (not shown). Still further, the probe 120 could be mounted to conduit 118 so that water is treated while flowing through conduit 118 prior to spout 121. In a preferred embodiment, the generator employed for the direct injection of electromagnetic radiation operates at about 40 volts (peak to peak) with 425 milliamps current.

Accomplishment of combined electromagnetic and magnetic treatment of a liquid in a beverage brewing device could readily be made by combining all or portions of the FIG. 1 and FIG. 6 embodiments, such as for example, including the probe 120 in FIG. 1 in advance of the multi-magnet system 20. Similarly, if achievement of holding qualities is of paramount importance, as opposed to usage of coffee, the electromagnetic injection probe 120 could be located in the outlet 130 of the container.

Figure 8:
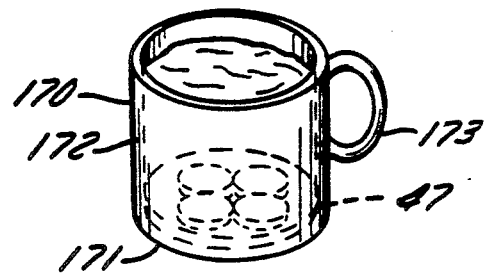
FIG. 8 is a partially cut away perpendicular view of a beverage holder having magnetic treatment according to a further embodiment of the invention.

FIG. 8 shows another feature of the invention, i.e., the treatment of a brewed beverage in a cup, mug or glass 170. Mug 170 has a circular bottom 171, cylindral sidewall 172 and handle 173 (of course, it could have a wide variety of shapes). A magnet treatment system 47 is embedded in the bottom 171 to continually treat the beverage contained therein. Magnet system 47 is preferred for the reasons set forth above although other magnet systems which provide relatively sharp lines of field gradient could also be employed.

While the invention has been described in connection with several preferred embodiments, the invention is not to be limited thereby, but is to be limited solely by the scope of the claims which follow. One skilled in the art, upon appreciating the various combinations useful for maintaining beverage quality and for enhancing the extraction capabilities of the liquid from which the beverage is to be brewed, could readily adapt the invention to various size appliances and for various end use applications.

What is claimed is:

1. In a beverage brewing device of the type which includes a containment means for confining ground material from which a beverage is to be brewed, a conduit for conveying a fluid to said containment means, the improvement comprising a treating device for modifying said fluid prior to the introduction thereof into said containment means, said treating device comprising means for directly injecting into said fluid electromagnetic radiation through a non-insulated conductor, said radiation having a preselected frequency related to the absorption emission profile of said fluid.

2. The invention set forth in claim 1 wherein said conductor is located within said conduit.

3. The invention set forth in claim 1 wherein said device includes a fluid reservoir and said conductor is located in said reservoir.

4. The invention set forth in claim 1 wherein said frequency is within the range of 1 KHz to 1000 MHz.

5. The invention set forth in claim 1 further including a means for magnetically treating said fluid upstream of said containment means.

6. The invention set forth in claim 5 wherein said magnetic treatment means comprises a magnetic treatment device having a multi-magnet arrangement, whereby a positive pole of a first magnet is located adjacent said conduit, a second magnet having a negative pole is located adjacent thereto, a third magnet having a negative pole is located on the opposite side of said conduit from said first magnet and aligned with said first magnet's positive pole and a fourth magnet having a positive pole is located on said opposite side of said conduit and is aligned with the negative pole of said second magnet.

7. The invention set forth in claim 5 wherein said conduit has a non-circular cross-section so that opposite sides of said conduit are closer to one another in one transverse section through said conduit and are further apart from one another in a second transverse section of said conduit.

8. The invention set forth in claim 7 wherein said magnetic treating means is located on said closer opposite sides of said conduit.

9. The invention set forth in claim 1 wherein said brewing device includes a pot means for holding a brewed beverage and means for heating said pot means, said heating means including a heat transfer surface for contacting said pot means and heat generating means for warming said surface.

10. The invention set forth in claim 9 wherein said heat generating means comprises a direct current resistance heater.

11. The invention set forth in claim 9 wherein said heat generating means comprises a means for conveying a heated liquid through another conduit in heat exchange relationship with said heat transfer surface.

12. The invention set forth in claim 9 wherein said heating means further includes a magnetic treatment system for treating a brewed beverage within said pot means.

13. A beverage brewing system comprising means for containing a ground material from which said beverage is to be brewed, means for magnetically treating a liquid to be introduced into said containing means through a conduit, pot means for holding a brewed beverage discharged from said containing means and means for heating said pot means including a heat transfer surface for contacting said pot means and heat generating means for warming said surface, said system further comprising another means for magnetically treating said brewed beverage contained within said pot means.

14. The invention set forth in claim 13 wherein said heat generating means comprises a direct current resistance heater.

15. The invention set forth in claim 13 wherein said heat generating means comprises a means for conveying a heated liquid through a conduit which is in heat exchange relationship with said heat transfer surface.

16. The brewing system of claim 13 further including means for directly injecting electromagnetic radiation into said liquid through a non-insulated conductor, said radiation having a preselected frequency related to the absorption emission profile of said liquid.

17. The invention set forth in claim 16 wherein said conductor is located within said conduit and in advance of said containing means.

18. The invention set forth in claim 16 wherein said frequency is within the range of 1 KHz to 1000 MHz.

19. The invention set forth in claim 13 wherein said conduit has a non-circular cross-section so that opposite sides of said conduit are closer to one another in one transverse section through said conduit and are further apart from one another in a second transverse section of said conduit.

20. The invention set forth in claim 19 wherein said means for magnetically treating is located on said closer opposite sides of said conduit so as to be closer to one another.

21. The invention set forth in claim 13 wherein said magnetic treatment means comprises a magnetic treatment device having a multi-magnet arrangement, whereby a positive pole of a first magnet is located adjacent said conduit, a second magnet having a negative pole is located adjacent thereto, a third magnet having a negative pole is located on the opposite side of said conduit from said first magnet and aligned with said first magnet's positive pole and a fourth magnet having a positive pole is located on said opposite side of said conduit and is aligned with the negative pole of said second magnet.

22. The invention set forth in claim 13 wherein said another means comprises a plurality of circular face charged magnets arranged so that the polar charges thereof are oriented perpendicularly to said heat transfer surface, at least one of said face charged magnets having a positive pole so oriented and at least one of said face charged magnets having a negative pole so oriented.

23. A beverage brewing device comprising:
a first conduit for conveying heated water;

chamber means for holding a substance from which a beverage is to be brewed, said chamber means arranged to receive said heated water and having an outlet conduit through which a brewed beverage is discharged;

first means for treating water flowing through said first conduit including first and second magnet units fixed on opposite sides thereof;

said first magnet unit having a housing with upstream and downstream ends and a side abutting said first conduit, a first magnet in said housing having a positive pole at said upstream end and facing said abutting side and a second magnet having a negative pole at said downstream end and facing said abutting side;

said second magnet unit having a second housing with upstream and downstream ends and a side abutting said first conduit, a third magnet in said second housing having a negative pole at said upstream end and facing said abutting side and a fourth magnet having a positive pole at said downstream end and facing said abutting side; and means for securing said abutting sides of said first and second magnet units against opposite sides of said conduit so that the first magnet and third magnet are aligned opposite one another and said second and fourth magnets are aligned opposite one another.

24. The invention set forth in claim 23 wherein a magnet treatment means is disposed adjacent said outlet conduit of said chamber means.

25. The invention of claim 23 further wherein said outlet treatment means comprises third and fourth magnet units being constructed the same as the first and third magnet units respectively, said third and fourth magnet units being located on opposed sides of said outlet conduit of said chamber means.

26. The invention set forth in claim 23 wherein said brewing device includes a pot means for holding a brewed beverage and means for heating said pot means, said heating means including a heat transfer surface for contacting said pot means and heat generating means for warming said surface.

27. The invention set forth in claim 26 wherein said heat generating means comprises a direct current resistance heater.

28. The invention set forth in claim 26 wherein said heat generating means comprises a means for conveying a heated liquid through another conduit in heat exchange relationship with said heat transfer surface.

29. The invention of claim 26 further including a magnet treatment means for treating brewed beverage within said pot means.

30. The invention set forth in claim 29 wherein said another magnet means comprises a plurality of face charged magnets arranged so that the polar charges thereof are oriented perpendicularly of said heat transfer surface, at least one of said face charged magnets having a positive pole so oriented and at least one of said face charged magnets having a negative pole so oriented.

31. The invention set forth in claim 23 wherein said conduit has a non-circular cross-section so that opposite sides of said conduit are closer to one another in one transverse section through said conduit and are further apart from one another in a second transverse section of said conduit.

32. The invention set forth in claim 31 wherein said magnetically treating means is located on said closer opposite sides of said conduit.

33. The brewing system of claim 23 further including means for directly injecting electromagnetic radiation into said liquid through a non-insulated conductor, said radiation having a preselected frequency related to the absorption emission profile of said liquid.

34. The invention set forth in claim 33 wherein said conductor is located within said conduit.

35. The invention set forth in claim 33 wherein said frequency is within the range of 1 KHz to 1000 MHz.

36. A beverage brewing system comprising means for containing a ground material from which said beverage is to be brewed, pot means for holding a brewed beverage discharged from said containing means and means for heating said pot means including a heat transfer surface for contacting said pot means and heat generating means for warming said surface, said system further comprising means for magnetically treating said brewed beverage contained within said pot means.

37. The invention set forth in claim 36 wherein said magnet means comprises a plurality of face charged magnets arranged so that the polar charges thereof are oriented perpendicularly of said heat transfer surface, at least one of said face charged magnets having a positive pole so oriented and at least one of said face charged magnets having a negative pole so oriented.

38. A holder for a beverage comprising a chamber for such beverage and a magnetic treatment system adjacent thereto, said treatment system presenting magnetic force fields to said beverage, wherein said system includes a plurality of face charged magnets arranged so that the polar charges thereof are oriented perpendicularly to one surface of said holder, at least one of said face charged magnets having a positive pole so oriented and at least one of said face charged magnets having a negative pole so oriented.

* * * * *